United States Patent Office 2,963,309
Patented Dec. 6, 1960

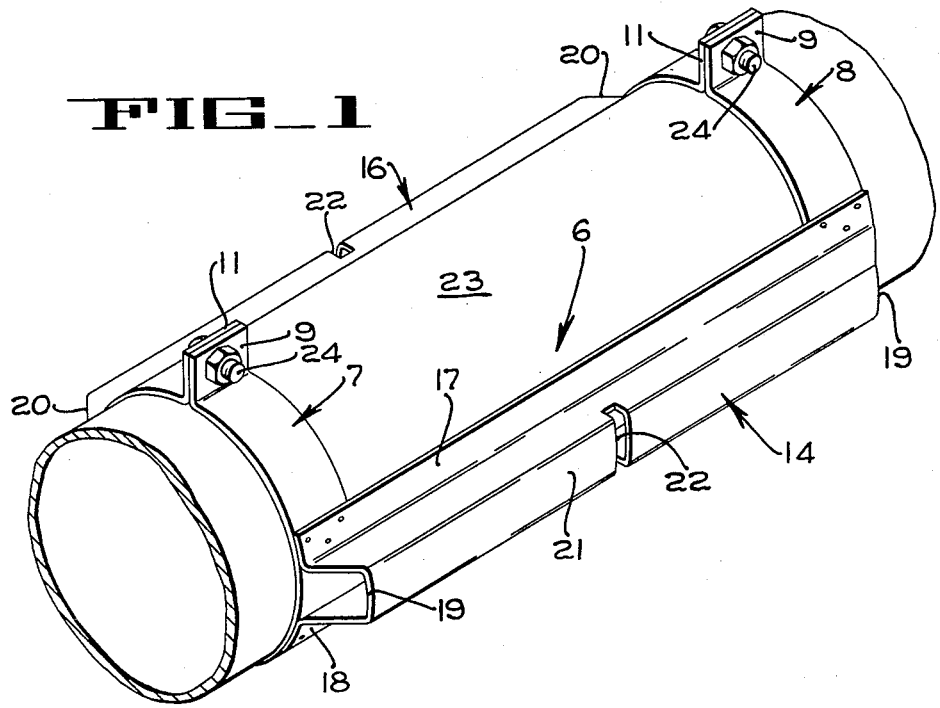
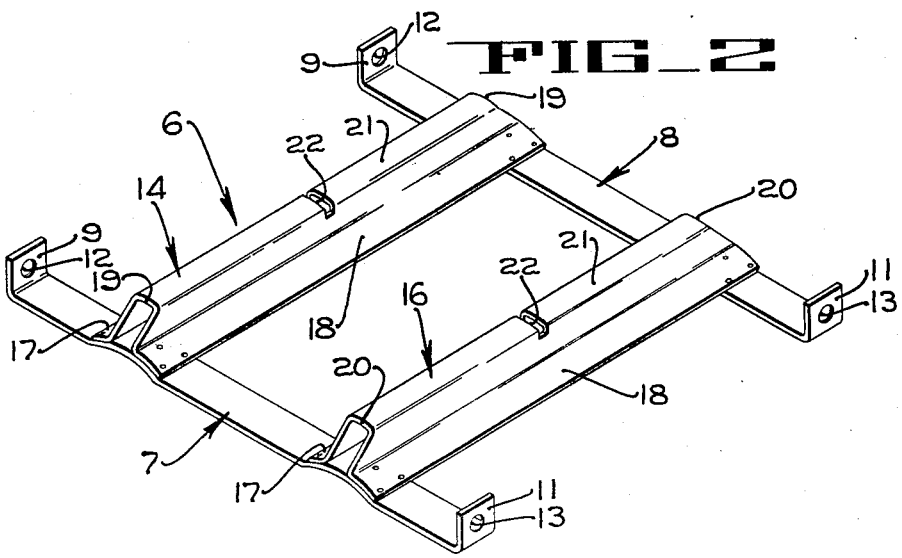

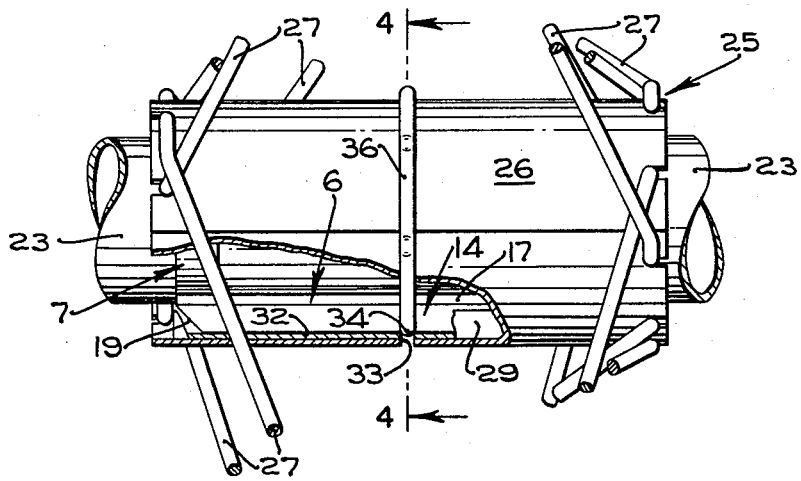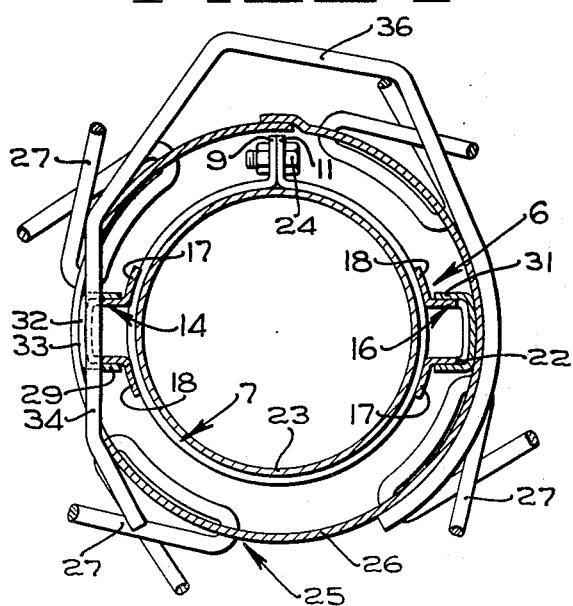

2,963,309

WHEEL MOUNTING DEVICE

Robert E. Stilwell, Santa Clara, Calif., assignor to Food Machinery and Chemical Corporation, San Jose, Calif., a corporation of Delaware Filed Oct. 12, 1956, Ser. No. 615,631

5 Claims. (Cl. 287—52)

The present invention appertains to an improved device for mounting a wheel in driving engagement on a cylindrical drive member such as a section of pipe in a wheeled, portable irrigation system.

In one extensively used portable irrigation system, interconnected sections of a portable irrigation pipe line are mounted on wheels in order that the pipe line may be more easily moved from place to place across a field. A drive wheel is usually mounted on each section of pipe of the pipe line in such a manner that the pipe itself acts as a drive shaft and each section of pipe is coupled together in driving engagement with its adjacent pipe section so that the entire pipe line may be manually or mechanically driven along the ground as a single unit. It is evident that the laborious task of uncoupling and later coupling each section of pipe for each change of position of the pipe line is eliminated when using an interconnected, wheeled, portable irrigation system of this type.

The length of each section of pipe as used in these systems is generally 20 feet or longer while the wheel diameter is approximately 5 feet. It is obvious, because of these large dimensions, that a serious storage problem would exist at the end of the irrigation season if the wheels were permanently fixed to or were difficult to remove from the pipe sections on which they are mounted.

It is, therefore, one object of this invention to provide a wheel mounting device arranged to efficiently receive and lock a wheel on a section of pipe and to permit the removal of the wheel from the pipe section without the aid of tools.

Another object is to provide an inexpensive and simple device for locking a wheel in driving engagement with a pipe section and against axial movement along the pipe.

These and other objects and advantages of the present invention will become apparent from the following description taken in connection with the following drawings, in which:

Fig. 1 is a perspective of the wheel mounting device of the present invention shown mounted on a section of pipe.

Fig. 2 is a perspective of the wheel mounting device of Fig. 1, shown in a flattened condition before being assembled on a pipe section.

Fig. 3 is a fragmentary plan view of the hub of a wheel mounted on the wheel mounting device of Fig. 1, with parts broken away to show a portion of the mounting device.

Fig. 4 is an enlarged section taken along the lines 4—4 of Fig. 3.

The wheel mounting device or clamp 6 of this invention is of very simple and inexpensive construction and is shown in Fig. 1 after being installed on a section of pipe, and in Fig. 2 as it appears before installation on a pipe. The wheel mounting device 6 is in the form of a clamp and comprises a pair of spaced parallel bands or straps 7 and 8, each having upwardly extending flanged end portions 9 and 11. Each flanged portion 9 is provided with an aperture 12 while each flanged portion 11 is provided with an aperture 13, for reasons which will be explained later. A pair of wheel driving channel members 14 and 16, each having arcuate mounting flanges 17 and 18, are rigidly secured on the bands 7 and 8, as by welding. The channel members 14 and 16 are arranged to extend transversely of the bands 7 and 8 and are spaced a predetermined distance from each other. It should be pointed out that the material from which the bands 7 and 8 are made is preferably thin and flexible, so that the bands may assume the arcuate form of the flanges 17 and 18 and when the flanges are welded thereto and so that both bands 7 and 8 may be easily deflected by hand into an annular shape without requiring the use of special tools. Both ends 19 of the channel member 14 and both ends 20 of the channel member 16 are beveled, as clearly shown in Fig. 2, while the outer surface 21 of each channel member 14 and 16 is provided with a transverse slot 22 which is positioned at approximately the longitudinal midpoint of the members 14 and 16.

In order to secure the wheel mounting device 6 on a section of pipe 23 (Fig. 1), the bands 7 and 8 are merely bent around the pipe 23 so that the end flanges 9 and 11 of each band 7 and 8 are positioned immediately adjacent each other, thereby allowing a bolt 24 to be placed through each pair of apertures 12 and 13 to rigidly secure the flanges 9 and 11 together and thus rigidly clamp the bands 7 and 8 upon the pipe 23. The wheel drive members 14 and 16 are so spaced on the bands 7 and 8 that they are positioned diametrically opposite each other when the device 6 is mounted on the pipe 23.

A wheel 25, which is shown without its rim in Figs. 3 and 4, and which has a hub 26 and spokes 27 extending outwardly from the hub to the rim, is arranged to be locked in driving engagement on the wheel mounting device 6. The hub 26 is a cylindrical member and has a pair of diametrically opposite, longitudinally extending driven channel members 29 and 31 (Fig. 4) which are secured, as by welding, to the inner surface of the hub 26 and are arranged to open inwardly. The channel 29 is arranged to receive the hub drive member 14, and the channel 31 receives the drive member 16. A transverse slot 33 (Fig. 3) extends through a portion of both the hub 26 and the base 32 of the channel 29 at approximately the longitudinally midpoint of the hub 26. When the hub of the wheel is placed over the mounting clamp 6 on the pipe, the slot 33 is aligned with the slot 22 in one of the drive members 14 or 16. The aligned slots 22 and 33 are then arranged to receive a locking leg 34 of a spring clip 36 which prevents axial movement of the hub relative to the mounting clamp 6. The clip 36 is of generally U-shaped configuration and is arranged to straddle the hub 26 in order to hold the locking leg in the aligned slots.

In the operation of mounting the wheel 25 on the pipe 23, the wheel mounting clamp 6 is firmly clamped on the pipe 23 by means of the bolts 24 and the spring clip 36 is fitted on the hub 26 of the wheel 25 with its locking leg 34 positioned in the slot 33. The end of the pipe 23 is then inserted within the hub 26 of the wheel 25 and the wheel driving channels 14 and 16 of the mounting device 6 are aligned with the driven channels 29 and 31, respectively, as seen in Fig. 4. The pipe 23 and attached wheel mounting device 6 are then moved axially into the hub 26 of the wheel 25 until one of the beveled ends 19 of the member 14 contacts and moves the locking leg 34 of the spring clip 36 radially outwardly in the slot 33. As the axial movement of the pipe 23 and mounting device 6 is continued, the locking leg 34 rides along the outer surface 21 of the member 14 until it falls in the slot 22 provided in the surface 21, thus locking the wheel mounting device 6 against further axial movement relative to the wheel 25. The positioning of the driving members 14 and 16 within the driven channels 29 and 31, obviously locks the wheel 25 in rotary driving engagement on the mounting device 6 and the pipe 23. It should be pointed out that the pipe 23 may be rotated 180 degrees with respect to the hub 26 so that the driving member 16, in place of the member 14, may be slidably received within the driven channel 29 without any change in the above described mounting procedure. Thus, to mount the wheel 25 on the pipe 23 after the mounting device 6 has been clamped on the pipe 23 and after the locking leg 34 of the clip 36 is positioned in the slot 33 of the wheel hub 26, the operator has only to align the different parts and to move the pipe 23 and device 6 axially into the hub 26 until the locking leg 34 springs into engagement in the slot 22.

In order to remove the wheel 25 from the pipe 23, the operator merely moves the locking leg 34 of the spring clip 36 outwardly a distance sufficient to remove the leg 34 from locking engagement in the slot 22 provided in the member 14. The operator then slides the pipe 23 free of the hub 25 allowing the locking leg 34 to remain in the slot 33 which is provided in the hub 26 and the driven channel 29.

The novel wheel mounting device of this invention has the advantage over previous devices of this type of being simple and inexpensive to manufacture and of providing a means which enables an operator to quickly, easily and securely mount a wheel on a shaft without the aid of tools of any kind. A further advantage of the device of this invention is that there are no small and easily misplaced parts which must be removed from either the pipe or wheel during the assembly or disassembly operation.

While an embodiment of the invention is shown wherein two bands 7 and 8 are used it is evident that these bands could be replaced by one wide flexible or deformable band. Also, it will be understood that various other changes and modifications may be made without departing from the spirit of the invention or scope of the appended claims.

Having thus described the present invention and the manner in which the same is to be used, what is claimed as new and desired to protect by Letters Patent is:

1. An apparatus for mounting a wheel on a pipe comprising a flexible strap adapted to be clamped on the pipe, a driving member secured to said strap and extending radially outwardly therefrom and having a beveled end portion and a transverse slot formed in the periphery thereof, a wheel hub arranged to be disposed around the pipe and over said driving member, a driven member disposed on said hub and arranged to slidably receive said driving member in driving engagement, said hub and said driven member being provided with a transverse slot arranged to be aligned with the slot provided in the driving member to provide a drive connection between the pipe and said hub, and a spring clip mounted on said hub and having a locking portion resiliently positioned within the slot provided in the hub and the driven member to project within the hub and to lie in the path of movement of said driving member as said hub is positioned over said driving member, whereupon relative axial movement between said driving member and said hub causes said beveled end portion of said driving member to contact and move said locking portion of said spring clip outwardly to thereafter slide upon the periphery of said driving member until said clip resiliently engages the slot provided in the driving member preventing further axial movement between said hub and said driving unit.

2. An apparatus for mounting a wheel on a pipe comprising a flexible strap adapted to be clamped on the pipe, a pair of driving members secured to said strap and extending radially outwardly from and longitudinally along the pipe and having beveled end portions and a transverse groove formed in the periphery of said driving members, a cylindrical wheel hub arranged to be disposed around the pipe, a pair of driven members mounted on the inner surface of said hub, each member being aligned with and arranged to straddle one of said driving members, one of said driven members and said wheel hub being provided with a transverse slot, and a resilient spring clip arranged to straddle said wheel hub and having a portion thereof positioned in the slot provided in the hub and driven member and projecting within the hub in the path of movement of one of the driving members as the pipe is moved into the hub, whereupon relative axial movement between said driving member and said hub causes said beveled end portion of said driving member to contact and resiliently move said portion of said spring clip outwardly to thereafter slide upon the periphery of said driving member until said clip resiliently engages the slot provided in the driving member preventing further axial movement between said hub and said driving unit.

3. In an apparatus for mounting a wheel on a pipe or the like, a pair of spaced flexible straps each being adapted to be bent from a substantially flat configuration wherein the ends of each strap are spaced from each other to an annular form around and in frictional engagement with the pipe with an end of each strap disposed immediately adjacent to the other end of the same strap, a flange secured on each end of each strap, fastening means operatively interconnecting both flanges on each strap for drawing said connected flanges together to frictionally engage the straps with the pipe, and a wheel drive member rigidly secured on said straps and spaced from said flanged end portions.

4. An apparatus for mounting a wheel on a pipe comprising a pair of flexible clamp members having flanged end portions and each member being adapted to be bent from a substantially flat configuration wherein the flanged ends of each clamp are spaced from each other to an annular form around and in frictional engagement with the pipe with the flanges on each clamp disposed immediately adjacent the other flange on the same clamp, fastening means operatively connected to both flanges on each clamp for drawing said connected flanges together to frictionally engage the clamps with the pipe, a longitudinally extending wheel driving member secured on said clamp members and having a slot in the outer surface thereof, said driving member having one end beveled, a wheel hub mounted on said pipe for movement axially thereof, an inwardly opening driven channel member secured on said hub for slidably receiving said drive member therein upon axial movement of said hub to provide a drive connection between the pipe and said hub, said hub and said driven channel having a slot therein which extends through the periphery of said hub and into said driven channel member, and a resilient locking member received in stressed condition in the slot in said driven channel and disposed in position to be engaged by the beveled end of said driving member to move said locking member away from said pipe upon axial movement of said driving member within said driven member whereby continued axial movement allows said locking member to become resiliently engaged in the slot in said driving member to lock said hub against further axial movement on the pipe.

5. An apparatus for mounting a wheel on a cylindrical support member comprising a pair of spaced flexible straps adapted to be bent from a substantially flat configuration wherein the ends of each strap are spaced from each other to an annular form around and in engagement with said cylindrical member, a flange on each end of each of said straps, a flange on each strap being disposed adjacent the other flange on the same respective strap when said straps are in the annular form, a wheel driving member mounted on said straps and projecting radially outwardly therefrom, said wheel driving member having tapered ends and a locking slot formed in its outer surface, and means for drawing both flanges on each strap together.

References Cited in the file of this patent

UNITED STATES PATENTS

| | | |
|---|---|---|
| 2,577,571 | Ewing | Dec. 4, 1951 |
| 2,702,717 | Cornelius | Feb. 22, 1955 |